United States Patent
Harris

(10) Patent No.: US 11,420,742 B2
(45) Date of Patent: Aug. 23, 2022

(54) UNMANNED AERIAL VEHICLE DRIVEN BY PRESSURIZED CONTENT

(71) Applicant: Lee Harris, Madison, GA (US)

(72) Inventor: Lee Harris, Madison, GA (US)

(73) Assignee: TetherKraft Technologies, LLC, Madison, GA (US)

( * ) Notice: Subject to any disclaimer, the term of this patent is extended or adjusted under 35 U.S.C. 154(b) by 346 days.

(21) Appl. No.: 16/275,284

(22) Filed: Feb. 13, 2019

(65) Prior Publication Data

US 2020/0255146 A1    Aug. 13, 2020

(51) Int. Cl.
| | |
|---|---|
| B64D 1/16 | (2006.01) |
| G05D 1/00 | (2006.01) |
| B64C 39/02 | (2006.01) |
| A62C 37/00 | (2006.01) |
| A62C 31/28 | (2006.01) |

(52) U.S. Cl.
CPC ............. B64D 1/16 (2013.01); A62C 31/28 (2013.01); A62C 37/00 (2013.01); B64C 39/024 (2013.01); G05D 1/0027 (2013.01); B64C 2201/128 (2013.01); B64C 2201/146 (2013.01)

(58) Field of Classification Search
CPC .......... B64D 1/16; B64D 1/18; G05D 1/0027; B64C 39/024; B64C 2201/146; B64C 2201/128; B64C 2201/042; B64C 2201/044; B64C 2201/048; B64C 2201/046; B64C 2201/04; A62C 37/00; A62C 31/28; A62C 3/02; A62C 3/0214; A62C 3/0228; A62C 3/0242; A62C 3/08; Y02E 10/20; Y02E 10/90; B60K 3/04; B60K 3/00; B60K 7/0015; B60K 7/0023; F03B 17/061; F03B 17/062; F03B 17/06
See application file for complete search history.

(56) References Cited

U.S. PATENT DOCUMENTS

| | | | | |
|---|---|---|---|---|
| 3,260,479 | A * | 7/1966 | Eickmann | B64C 27/12 244/17.13 |
| 3,381,922 | A * | 5/1968 | Laing | B64C 39/022 244/136 |
| 10,011,352 | B1 * | 7/2018 | Dahlstrom | B64C 39/024 |
| 10,150,562 | B2 * | 12/2018 | Hein | B64C 39/022 |
| 2008/0099600 | A1 * | 5/2008 | Perry | B64C 39/024 244/70 |

(Continued)

FOREIGN PATENT DOCUMENTS

WO    WO-2014080385 A2 *    5/2014    ........... A62C 3/0228

*Primary Examiner* — Peter D Nolan
*Assistant Examiner* — Michael F Whalen
(74) *Attorney, Agent, or Firm* — Smith Tempel Blaha LLC; Matthew T. Hoots

(57) ABSTRACT

A content-driven and content delivery UAV system. The UAV system includes a content source to provided pressurized content to the UAVs via a content transmission media. The pressurized content is utilized to drive a mechanical propulsion and steering system to keep the UAV aloft and direct it to a particular location. The pressurized content received by the UAVs can be directed back to the content source, to another UAV and or discharged from the UAV to a desired target. Thus, the UAVs may include a nozzle or valve for discharging the content and thus delivering the content to a desire location.

8 Claims, 8 Drawing Sheets

(56) References Cited

U.S. PATENT DOCUMENTS

| | | | |
|---|---|---|---|
| 2008/0238105 A1* | 10/2008 | Ortiz | B60K 6/485 |
| | | | 290/54 |
| 2014/0140871 A1* | 5/2014 | Grieser | B64C 27/12 |
| | | | 417/410.1 |
| 2015/0060090 A1 | 3/2015 | Harris | |
| 2017/0087973 A1* | 3/2017 | Gaither | B60K 16/00 |
| 2019/0106212 A1* | 4/2019 | Furukawa | B64F 3/00 |
| 2019/0160315 A1* | 5/2019 | Head | G05D 1/0094 |
| 2019/0168875 A1* | 6/2019 | Ashur | B08B 3/024 |
| 2020/0047884 A1* | 2/2020 | Lee | B64D 1/16 |
| 2020/0216173 A1* | 7/2020 | Suefuku | B08B 3/024 |

\* cited by examiner

UNMANNED AERIAL VEHICLE DRIVEN BY PRESSURIZED CONTENT

BACKGROUND

The present invention relates to the utilization of unmanned aerial vehicles (UAV) for the delivery of pressurized content and, more specifically, the utilization of UAVs for the delivery of pressurized content while using the pressurized content to provide and/or supplement the drive power of the UAV.

UAVs, or using the tech savvy vernacular, "drones", are becoming ubiquitous in industrial, commercial, municipal and military applications. Remotely operable UAVs are used for everything from traffic monitoring and surveillance (e.g., a UAV with a mounted camera) to painting (e.g., a UAV with a mounted spray gun). Regardless of the particular application, UAVs known in the art are generally driven by one or more battery powered electrical or hydrocarbon based combustion motors, as would be understood by one of ordinary skill in the art. Using a ground-based controller, an operator on the ground may wirelessly communicate with a control circuit mounted within the UAV. The control circuit, in turn, is communicably coupled to a lift system including one or more electrical or hydrocarbon based combustion motors configured to drive propellers and/or vanes for steering the UAV. The control circuit within the UAV may also be configured to separately control the UAV-mounted system, such as a camera or a paint-spray gun. As one of ordinary skill in the art would understand, for those UAVs known in the art with a UAV-mounted system for delivering a pressurized media, such as pressurized paint via a spray nozzle mounted on the UAV, the UAV may be tethered to a media reservoir via a line or hose (the media reservoir may or may not be pressurized depending on the system arrangement). Thus, a UAV could be utilized to direct a measure of content to a particular location. However, such use of a UAV is limited as the devices can only operate for a limited amount of time between charges or refueling. As such, there is a need in the art for a UAV that can be used to deliver content to a location while alleviating the restrictions imposed by limited flight time.

At present, systems and method for fighting fires, particularly forest fires, suffer from one or more inadequacies. The use of large helicopters to transport "buckets" of water dipped from a nearby lake, for instance, provides limited ability to control where and how much water is applied to the fire. As a result, the water may be inefficiently used due to poor timing in the release of the water from the bucket or may be wasted by being dumped on an area of the fire that is under control or does not require a large volume of water to be extinguished. Other methods for fighting fires necessarily require that firefighters be in close proximity to the fire, which may place the firefighters in danger of physical harm.

Therefore, what is needed in the art is a system and method for fighting fires that makes efficient use of a water supply and/or fire retardant and alleviates the need for firefighters to be in close physical proximity with the fire. Further, there is a need in the art for a UAV system that can be utilized to deliver content to a desired location and that is not restricted in flight time due to battery life or fuel supply, such as hydrocarbon based fuel storage limitations.

BRIEF SUMMARY OF THE INVENTION

Various embodiments, aspects and features of the present invention encompass a UAV system that includes one or more UAVs for delivering content or for performing other functions. In general, a content source is used to provided pressurized content to one or more UAVs via a content transmission media. The pressurized content is utilized to drive a mechanical propulsion and steering system to keep the UAV aloft and direct it to a particular location. The pressurized content received by the UAVs can be directed back to the content source, to another UAV and or discharged from the UAV. Thus, the UAVs may include a nozzle or valve for discharging the content and thus delivering the content to a desire location.

DETAILED DESCRIPTION OF THE INVENTION

Figure 1:
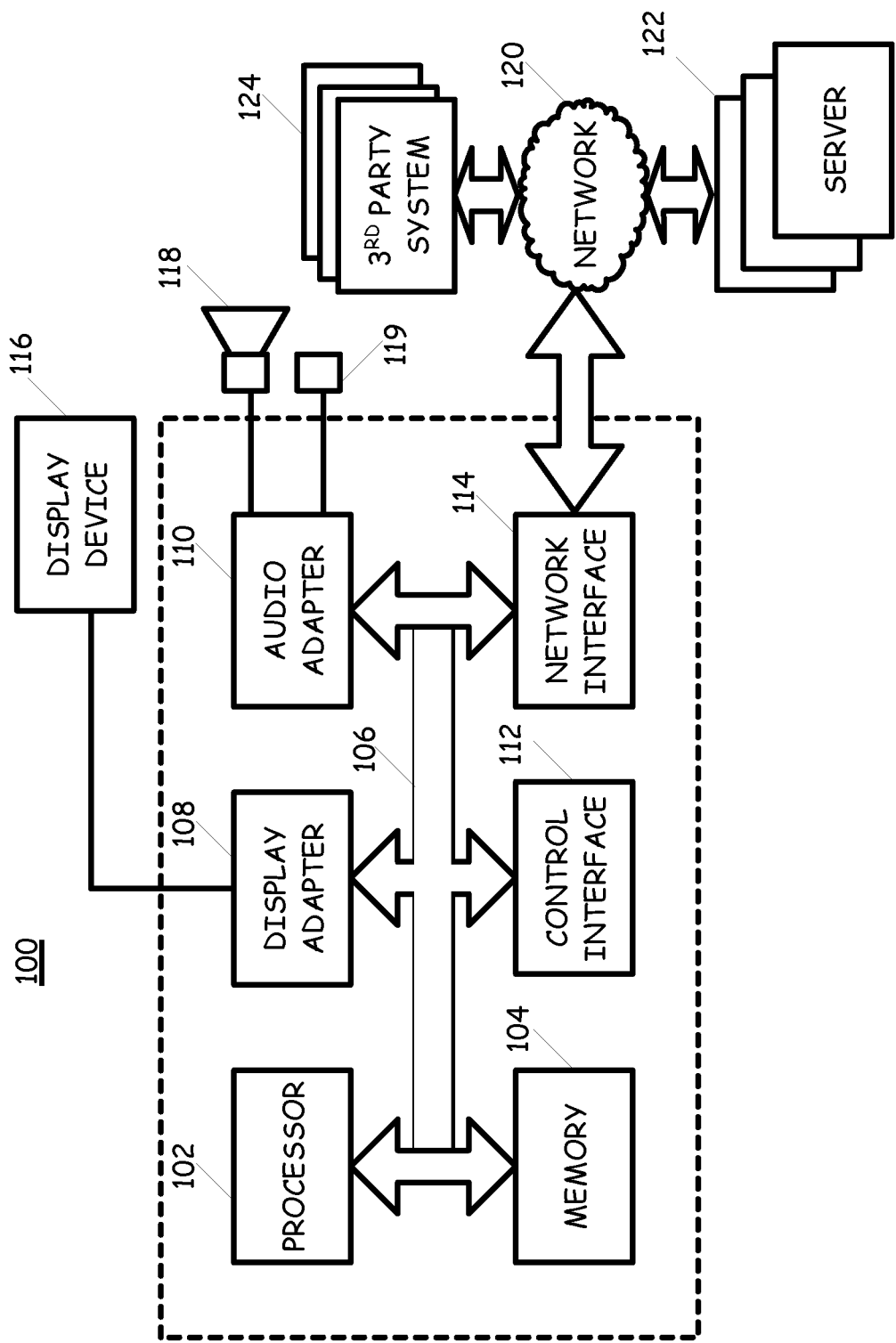
FIG. 1 is a functional block diagram of the components of an exemplary embodiment of a system or sub-system that could be used in various components of various embodiments of a UAV system.

Various embodiments of a UAV system, as well as the functionality, features and aspects of the system and components thereof are presented herein and illustrated in the various drawings. In general, an exemplary UAV system includes a variety of components, such as but not limited to, one or more UAVs that are connected to or tethered to a content source. Each of the UAVs may include a propulsion system, a content delivery system and a controller. The propulsion system is used to fly the UAV and steer it to certain locations. The content delivery system is used to receive content from the content source and then direct it back to the content source, direct it to a desired location and/or direct it to another UAV. The controller interfaces with both the propulsion system and the content delivery system to control their operation. Further, the control system also interfaces to a command system where commands to control the UAV system are received and transmitted to the control system. The content source pressurizes the content and delivers the content to the UAVs via a transmission medium. The pressurized content is used, among other things, to drive the propulsion system. As such, the UAVs within the UAV system can be manipulated to deliver content received through the transmission medium to a desired location through the command system receiving commands to control the movement of the UAV and commands to control the delivery of the content and sending the received commands to the control system of the appropriate UAV.

In one or more embodiments, a pressurized media source is utilized as a motive force to power the lift system or propulsion system of a UAV. The propulsion system may be driven by a turbine, gear arrangement, or some other mechanical configuration operable to be driven by an input of a pressurized media (i.e, media-driven motor). After the pressurized media exits the media-driven motor, it may be returned to a content source, passed to another UAV and/or be exhausted from the UAV. Advantageously, exhausted content can be directed to a target area external to the UAV.

Turning now to the figures, where like labels represent like elements throughout the drawings, various aspects, features and embodiments of exemplary tethercraft systems and methods will be presented in more detail. The examples as set forth in the drawings and detailed description are provided by way of explanation and are not meant as limitations on the scope of a UAV system. As an example, while embodiments of the UAV system are described as being utilized for remote distribution of water and/or fire retardant on a fire or delivery of other liquid mediums, the UAV system is not limited to such an application. A UAV system and method thus includes any modifications and variations of the following examples as come within the scope of the appended claims and their equivalents.

FIG. 1 is a functional block diagram of the components of an exemplary embodiment of a system or sub-system that could be used in various functional or operational components of various embodiments of a UAV system. It will be appreciated that not all of the components illustrated in FIG. 1 are required in all embodiments of the various components within the UAV system but, each of the components are presented and described in conjunction with FIG. 1 to provide a complete and overall understanding of the components that could be incorporated into various embodiments. Further, in some embodiments, additional components not illustrated may be added for particular interfaces and functionality. It should also be appreciated that the functional blocks, as illustrated in FIG. 1, are separated out simply to convey functionality. The functionality of the various blocks could be implemented in a variety of structures including hardware and/or software components and the functionality can be grouped or spread out among various components in a variety of fashions. Thus, one or more of the processing structures illustrated in FIG. 1 could be used to implement one or more of the functional aspects of the UAV system.

The system, subsystem or general computing platform (generally referred to as the "platform") 100 is illustrated as including a processor/memory device 102/104 that may be integrated with each other or communicatively connected over a bus or similar interface 106. The processor 102 can be a variety of processor types including microprocessors, micro-controllers, programmable arrays, custom IC's, etc., and may also include single or multiple processors with or without accelerators or the like. The memory element of 104 may include a variety of structures, including but not limited to RAM, ROM, magnetic media, optical media, bubble memory, FLASH memory, EPROM, EEPROM, SIM cards, etc. The processor 102, or other components in the controller may also provide elements such as a real-time clock, analog to digital convertors, digital to analog convertors, control lines, input trigger lines, etc. The processor 102 may also interface to a variety of elements including a control interface 112, a display adapter 108, an audio adapter 110, and network/device interface 114. The control interface 112 provides an interface to external controls, such as sensors, actuators, drawing heads, nozzles, propulsion systems, steering systems, motors, valves, content delivery systems, user interfaces, input devices, cartridges, pressure actuators, leading mechanism, drums, step motors, a keyboard, a mouse, a pin pad, an audio activated device, as well as a variety of the many other available input and output devices or another computer or processing device or the like. The display adapter 108 can be used to drive a variety of user interface elements, such as display devices 116 including an LED display, LCD display, one or more LEDs or other display devices. The audio adapter 110 interfaces to and drives another alert element 118, such as a speaker or speaker system, buzzer, bell, etc. and can also interface to a microphone 119 or audio detector. The network/interface 114 may interface to a network 120 which may be any type of network including, but not limited to, the Internet, a global network, a wide area network, a local area network, a wired network, a wireless network, a data network, a telecommunications network, or any other network type including hybrids. Through the network 120, or even directly, the controller 100 can interface to other devices or computing platforms such as one or more servers 122 and/or third party systems 124. A battery or power source provides power for the platform 100.

Figure 2:
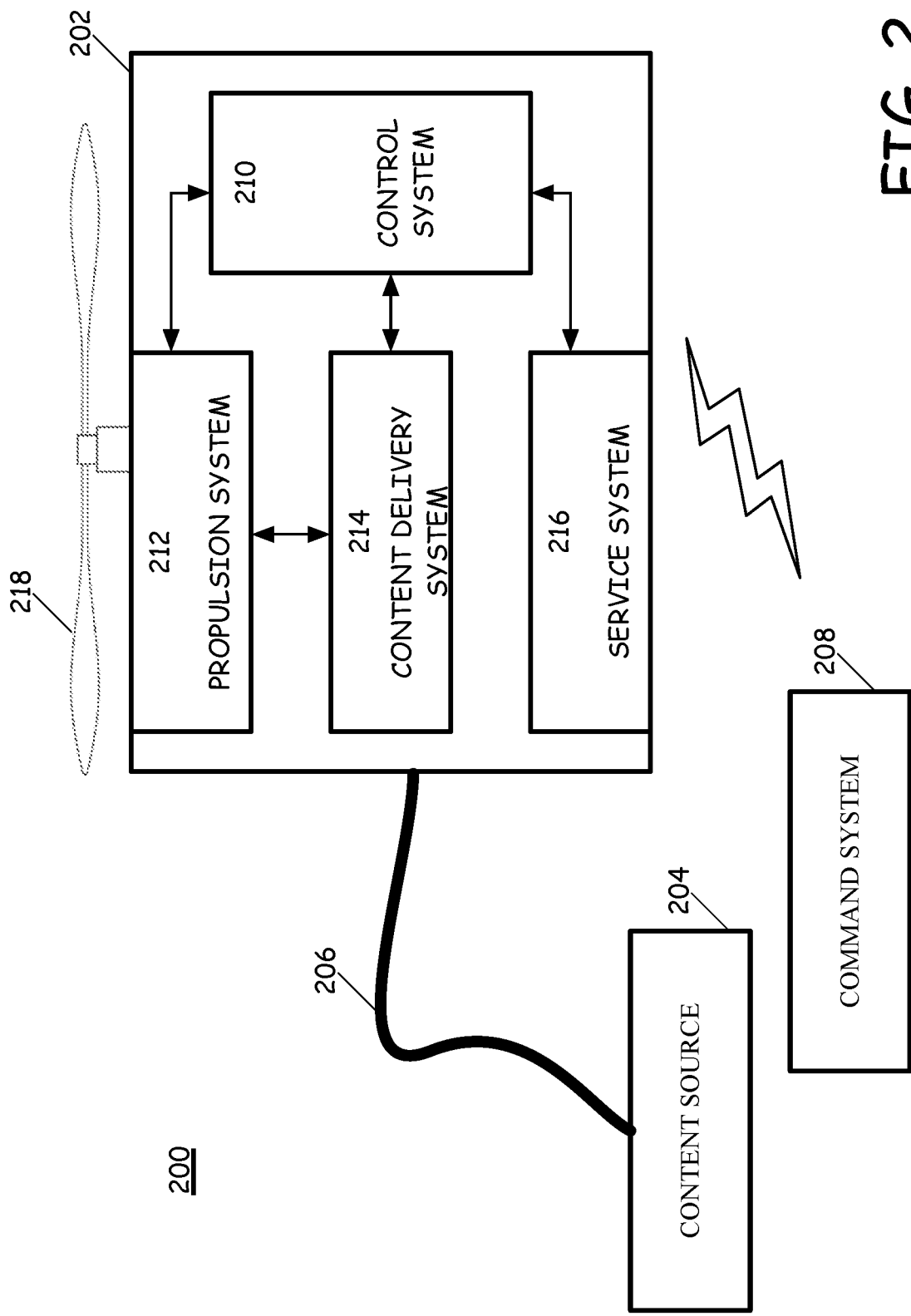
FIG. 2 is a block diagram illustrating exemplary functional elements of an exemplary UAV system that can be utilized for a variety of applications.

FIG. 2 is a block diagram illustrating exemplary functional elements of an exemplary UAV system that can be utilized for a variety of applications. The UAV system 200 is illustrated as including a single UAV 202, a pressurized content source 204, a transmission medium 206 and a command system 208. The exemplary UAV 202 is illustrated as including, but not limited to, a control system 210, a propulsion system 212, a content delivery system 214 and a service system 216.

The exemplary UAV 202 is weighted and balanced to enable the UAV 202 to fly in a steady manner and includes the ability for steering and directing the UAV 202 remotely or programmatically. Those skilled in the relevant art will be aware of the design characteristics to meet the aeronautical requirements for UAVs of various size and including various application specific adaptations. A typical UAV is made of light composite materials to reduce weight and increase maneuverability. The composite material strength allows UAVs to cruise at extremely high altitudes, survive harsh environmental conditions and absorb vibration.

Exemplary embodiments may include gyroscope stabilization technology to give the UAV smooth flight capabilities. Ideally, the gyroscope is highly reactive such that it almost instantly responds and reacts to the forces moving against the UAV. The UAV may also employ the use of an inertial measurement unit (IMU). An IMU works by detecting the current rate of acceleration using one or more accelerometers. The IMU detects changes in rotational attributes like pitch, roll and yaw using one or more gyroscopes. The IMUS may include a magnetometer to assist with calibration against orientation drift.

In general, the propulsion system 212 includes a mechanism to create lift for the UAV 202 and a steering mechanism to guide the UAV 212 as desired. In a typical UAV, motors and propellers are utilized to move the UAV into the air and to fly in any direction or hover. On a quadcopter, the motors and propellers work in pairs with 2 motors/propellers rotating clockwise (CW Propellers) and 2 motors rotating Counter Clockwise (CCW Propellers). In some embodiments the lift mechanism and the steering mechanism may be combined. In such embodiments, changing the rotation speed of select propellers and tilting the propellers can be used for steering. In other embodiments, one large fan jet could be utilized with the use of directional vanes or cones (such as in the Harrier Jump Jets as a non-limiting example).

The actual control of the propulsion system 212 may vary in different embodiments. For instance, in some embodiments, the propulsion system may include some autonomy to steer the UAV, hold the UAV at particular altitudes and control the speed and movement. In other embodiments, an onboard control system may interface to the propulsion system and in other embodiments, a smart remote may send commands directly to the propulsion system to control the operation. In the illustrated embodiments, a control system 210 operates to control the propulsion system in accordance with commands received from the command system 208. Thus, as a non-limiting example, a joystick and throttle lever on the command system 208 can be used to generate control commands that are sent to the control system 210. At the control system 210, the received commands are translated into controls that are fed to the propulsion system. The controls can be physical lines between the control system 210 and propulsion system 212, commands sent over a bus, or other technique. The command system 208 may interface to the control system 210 using one or more of a variety of technologies. For instance, the command system 208 may wireless interface with the control system 210 using RF technology, unlicensed banned frequencies, cellular technology, WIFI, infrared or Bluetooth or other wireless technologies. Alternatively, the communication connection between the command system 208 and the control system 210 may be a physical connection, such as a wire or fiber optic cable. In addition, a hybrid of different technologies may also be used.

The propulsion system may be one that is typically used in UAVs, such as battery powered electrical or hydrocarbon based combustion brushed or brushless motors. However, one aspect of the UAV system is to utilize a motor that is powered by the use of content delivered to the UAV 202 through the transmission medium 206 and originating from the content source 204. Various non-limiting examples of the structure used for this aspect of the UAV system 200 are presented within this description.

As one non-limiting example, the transmission medium may be a pair of thin copper wires delivering a DC voltage to power the motor driving the propulsion system 212. As such, the content would be DV voltage and current. In such an embodiment, the content delivery system 214 would receive the content and then use it to interface with and control the propulsion system 212.

As another non-limiting example, the content source may provide a liquid or gas fuel that can be burned to generate the energy to drive the motor. In such an embodiment, the transmission medium 206 would comprise a light-weight tube through which the liquid or gas fuel can be pumped to the content delivery system 214 and then used to fuel the motor.

In yet another non-limiting example, the content may be a pressurized gas or liquid that is used to drive a turbine within the propulsion system and thereby generate an AC or DC voltage through a servo motor to drive the propulsion system 212. It should be appreciated that hydro-motors, hydraulic motors, pneumatic motors or the like may also be utilized in various embodiments. In such an embodiment, the content may be a liquid, such as water, or a gas such as air, halon, etc. The content source 204 pressurizes the content and sends it to the content delivery system 214 by means of a light weight hose or tube. Obviously, in such an embodiment, the transmission medium 206 would include a reverse channel back to the content source or otherwise to a different location to ensure a flow through the transmission medium.

Further, the propulsion system 212 may be comprised of one or more of the above-described techniques as well as other techniques not listed. In some of the embodiments described herein, the control system 210 may also operate to control the flow of content through the content delivery system 214 to the propulsion system 212. For instance, a command to increase altitude may be transmitted from the command system 208 to the control system 210. The control system 210 may then increase the flow of content from the content delivery system 214 to the propulsion system to enable the propulsion system 212 to create more lift. Alternatively, this function can also be accomplished by the command system 208 interfacing directly to the content source 204 to increase the amount of content being delivered, such as more current, more pressure, etc.

Various embodiments of the UAV 202 may also include a service system 216. The service system 216 is focused on adding a functional capability to the UAV 202. As non-limiting examples, in one embodiment the service system 216 may include an on-board video camera. Thus, such an embodiment could be utilized for conducting inspections or assessments. For instance, the UAV system 200 could be utilized to monitor the growth and status for a fire or a storm. Other embodiments may include a camera, a speaker, a microphone, a light to serve as a beacon, robotic arms to perform repairs or to pick up and drop off items, magnets to pick up items, etc. The service system 216 can be controlled independently over a wired or wireless interface or can be controlled by the control system 210 as described in the above-listed exemplary embodiments.

Figure 3:
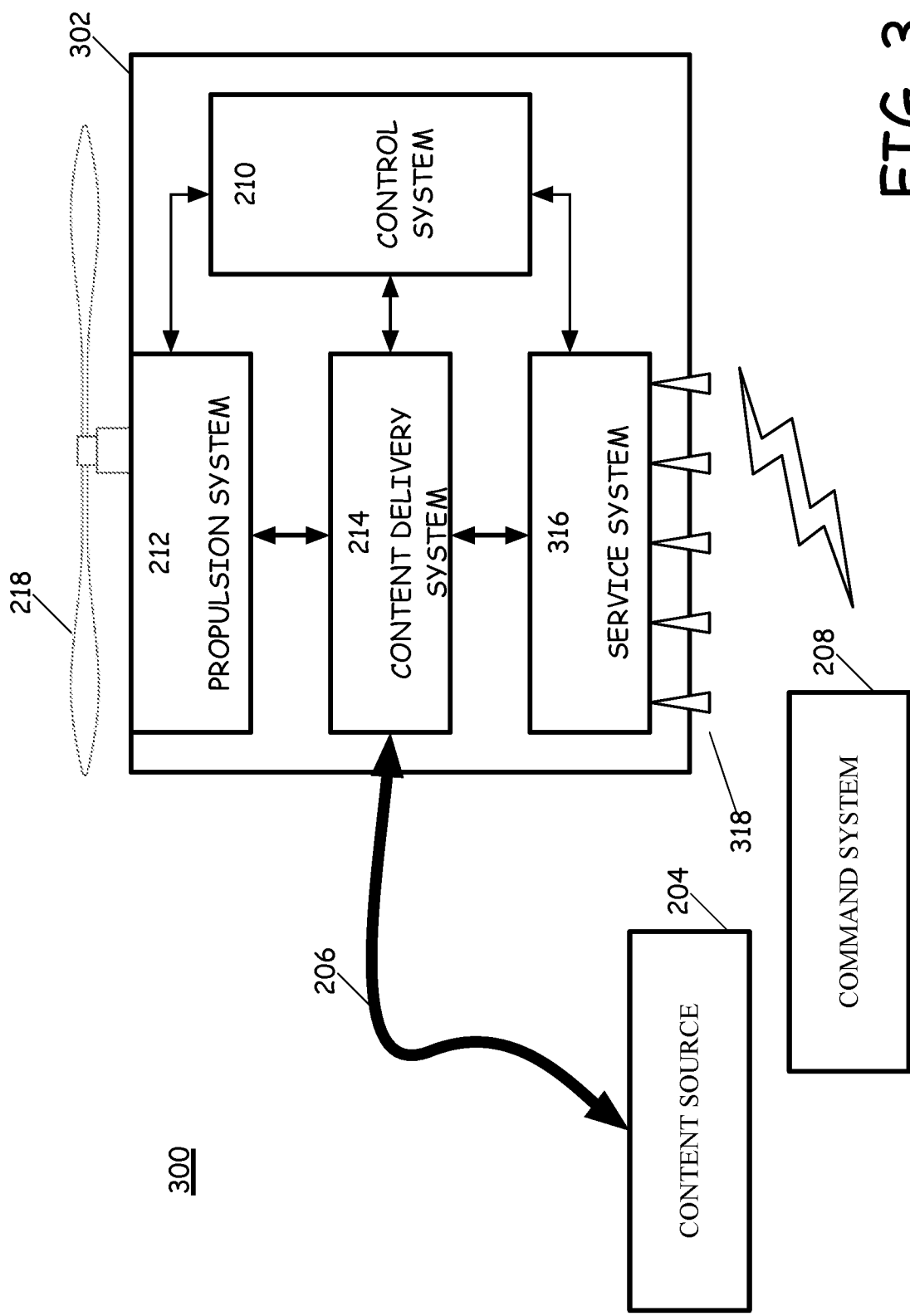
FIG. 3 is a specific exemplary embodiment of a UAV system.

FIG. 3 is a specific exemplary embodiment of a UAV system. The UAV system 300 illustrated in FIG. 3 is very similar to the UAV system 200 illustrated in FIG. 2. As such, like numbers are used for common elements in the two figures. The UAV 302 is illustrated as having a nozzle system, or discharge system 318 that is a part of the service system 316. In this embodiment, the content is delivered from the content source 204, through the transmission medium 206 to the content delivery system 214. The content, as described above, can be used to drive the propulsion system. However, rather than having a reverse channel back to the content source 204, the content can be discharged through the service system 316 and out of the nozzles 318. The content delivery system 214 in this embodiment may include an adjustable valve that enables content to be diverted to the service system 316 for discharging through the nozzles 318. In addition, another valve could be used to control the delivery of content to the propulsion system. It will be appreciated that the valves can be used to regulate volume of the flow of the content by adjusting the valve between a fully opened or a fully shut position with multiple settings there between. Thus, the flow of the content could be completely shut off from the propulsion system 212 and fully diverted to the service system 316. In such an embodiment, the propulsion system 212 would require and alternative source of power, otherwise the UAV 302 would rapidly lose altitude. Thus, a backup battery could then kick in to power a motor driving the propulsion system 212.

Advantageously, the UAV system 300 illustrated in FIG. 3 can be used as a delivery vehicle for the content. The embodiments may jointly use the content to power the UAV 302 and deliver the content to a desired location or, the embodiments may simply use an alternate power means for the propulsion system and simply deliver the content to a desired location or the embodiments may use the pressurized content for propulsion but then provide any of a variety of services. Non-limiting examples of uses of an embodiment that delivers content to a location include the delivery of insecticides over a crop, or microbial bugs over a contaminated water source. However, a very beneficial use of such an embodiment is in the delivery of water or fire retardant substances to assist in battling fires, such as forests fires, building fires, etc. or for the delivery of other contents for remediation and/or environmental protection. As a few non-limiting examples, the UVA system 300 could be used to: (a) deliver salt water or saline solutions to roads to treat them before expected ice and/or snow fall, as well as subsequent to the same, a forest fire or other fire, (b) deliver microbial bugs for pond remediation, (c) deliver chemicals, such as insecticides and fertilizers to crops, (d) deliver cool refreshing water or mist to a stadium of fans on a blistering hot businessman's day game or fans at an outdoor concert, (e) delivery chemical deterrents to unwanted persons, such as pepper spray, tear gas or the like, (f) deliver de-icing chemicals to planes as they taxi to the runway for takeoff (advantageously this use alleviates the need for the planes to sit at the gate for de-icing and thus, operates to save time or prevent delays, allows the chemicals to be applied moments before take-off or even up to take-off which can reduce the amount of chemicals required for effective de-icing and alleviates the risk of re-icing after the chemicals are applied and the plane taxis for take-off), etc.

Figure 4:
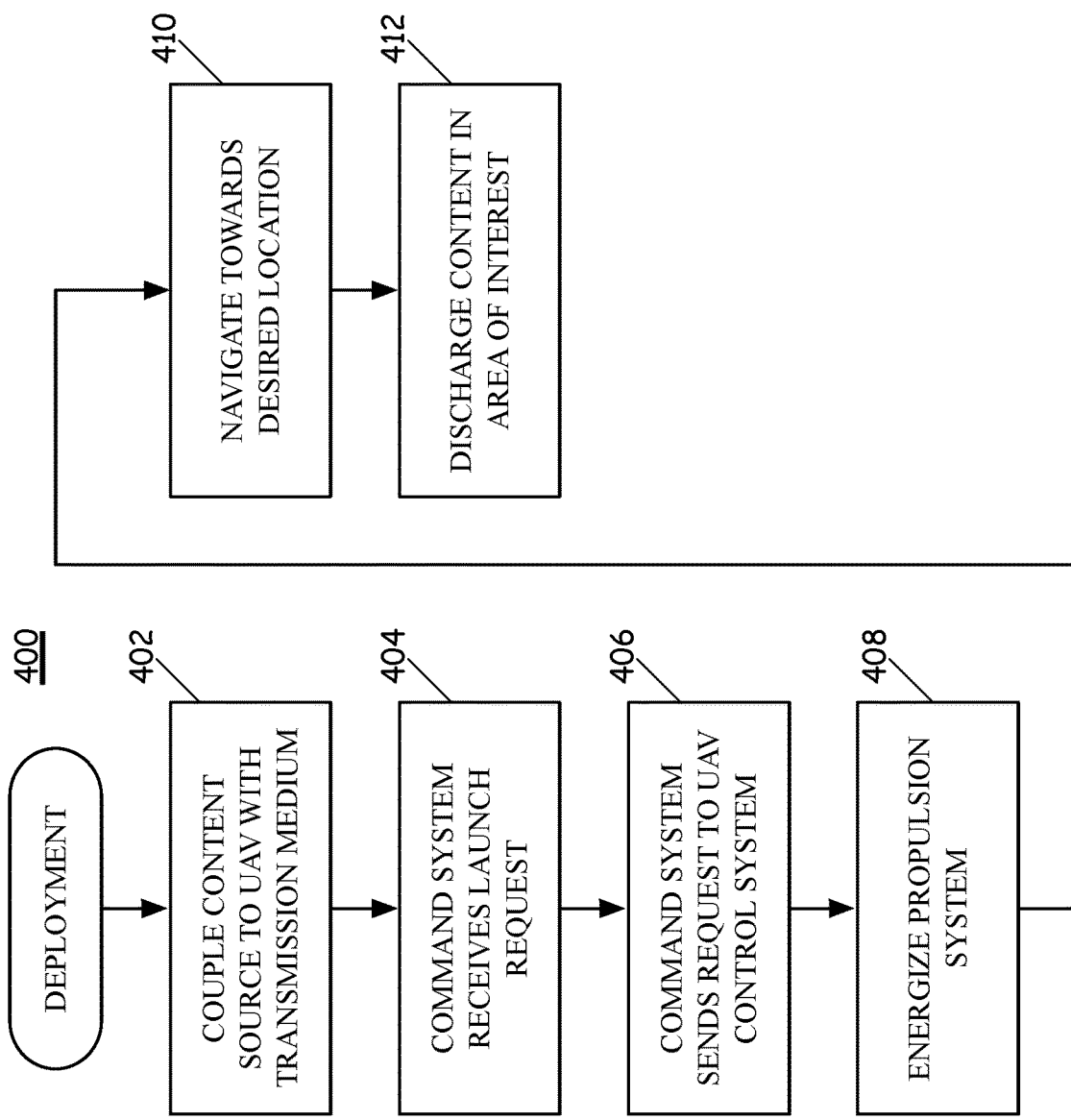
FIG. 4 is a flow diagram illustrating the operation of an exemplary embodiment of the UAV system 300 for delivering content to a desired location.

FIG. 4 is a flow diagram illustrating the operation of an exemplary embodiment of the UAV system 300 for delivering content to a desired location. Utilizing the embodiment of the UAV system 300 illustrated in FIG. 3, the content source 204 is delivered to the site of interest or a content source is otherwise available at the site of interest (for instance it content source could simply be a fire hydrant, water spigot, water reservoir, etc.). The content source is coupled 402 to the UAV 302 through the transmission medium 206. The transmission medium 206 is selected to have a length that is sufficiently long to enable the UAV 302 to travel a useful distance and cover a certain amount of area. However, the transmission medium 206 should be lightweight, flexible and not so long that the weight of the extended transmission medium 206 would pull the UAV 302 out of flight. The transmission medium 206 can be folded or rolled into a box for easily feeding as the UAV 302 is in flight, on a spool that can be cranked in or out as necessary, in an auto-retraction device or other similar mechanisms.

The UAV 302 can be set to flight or launched by enabling the propulsion system 212. Thus, the command system 208 can be used to request the propulsion system 212 to launch the UAV 302. Once a request is received by the command system 208 404, the command system 208 sends the request to the control system 210 406. The control system 210 then starts the propulsion system 212 by applying an energy source 408. As previously described, the energy source may be a fuel, a DC voltage, content from the content source, etc. And while the propulsion system 212 can be configured to operate on one or more different types of energy in various embodiments, the focus of the exemplary embodiment in FIG. 3 is a propulsion system that is powered by the pressurized content delivered by the content source 204 through the transmission medium 206. In such an embodiment, the control system 210, in response from commands received from the command system 208, can interface with the content delivery system 214 to direct the content towards the propulsion system 212 and to interface with the propulsion system 212 to control the navigation of the flight. While the content delivered to the UAV 302 can actually be a fuel, such as alcohol, gas, gas/oil blend, etc., the embodiment being described will focus on the content being a pressurized liquid or gas that is being used to power the motor through hydraulic or pneumatic or other pressurized conversion and also the content being delivered to a desired location. Thus, while a fuel for energizing the propulsion system could be delivered through the transmission medium presented herein, the focus is on the pressurized content being delivered to the propulsion system as a pressurized energy, such as pneumatic energy or hydraulic energy rather than a combustible energy. However, some embodiments may utilize a combustible energy in lieu of or in addition to the pressurized energy.

The content source 204 maintains the content under pressure. In some embodiments, the content source may increase or decrease the pressure depending on the need, such as how high the UAV 302 needs to fly and the volume of content being delivered to the site of interest. The content source 204 can use a pump to pressurize the content or other forces, such as gravity, etc. could be used to create the pressure. It should be understood that to convert the pressurized content into energy to drive the propulsion system 212, the content must have an ingress and an egress from the propulsion system. This can be accomplished in one or more of several manners. One such manner would include having a forward channel and a reverse channel in the transmission medium 206. The forward channel would bring content to the content delivery system 214 and the propulsion system 212 and the reverse channel would bring the content back to the content source. Another technique is to utilize the nozzle system 318 to discharge the content that has passed through the propulsion system. A third technique will be described in conjunction with FIG. 5 but in general, involves passing or directing the content to another UAV in the UAV system.

An advantage of utilizing a forward and reverse channel in the transmission medium 206 is that at the initial deployment of the UAV 302, it may not be desirable to discharge the content. This is especially true if the content includes a chemical or if the deployment area needs to remain dry. The reverse channel allows the UAV 302 to be deployed and all of the content remains intact. As such, the UAV 302 is deployed and the command system 208 is used to interface with the control system 212 in navigating the UAV 302 towards the desired location 410. Once the UAV 302 is deployed, the control system 210 can interface with the content delivery system 214 to redirect all or a portion of the content through the service system 316 to be discharged from the nozzles 318. Thus, as the UAV 302 approaches a target zone, such as a fire, the command system 208 can cause the UAV 302 to discharge content to an area of interest 412.

Figure 5:
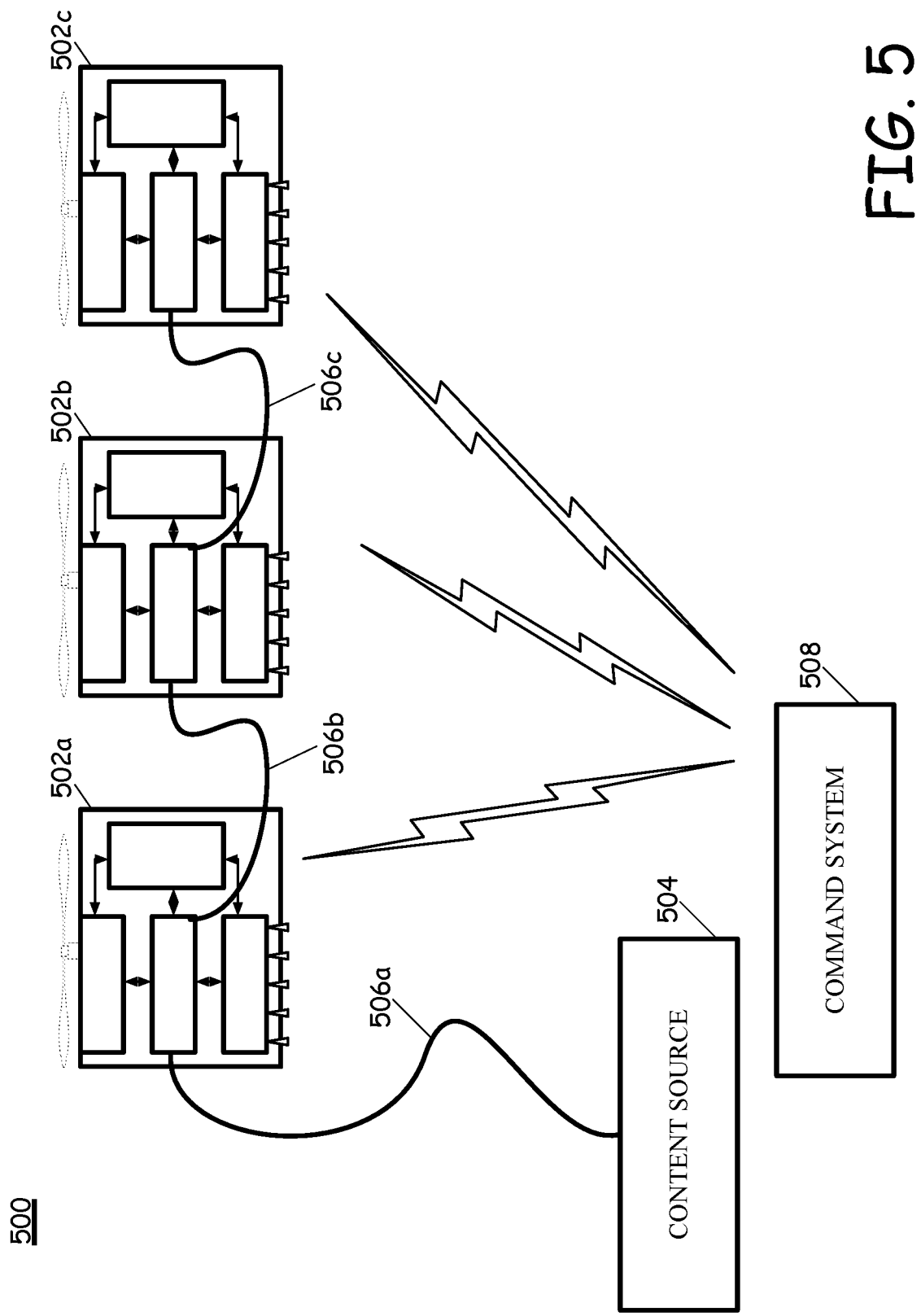
FIG. 5 is a conceptual diagram of a multi-unit UAV system 500 that could be deployed to service an area.

FIG. 5 is a conceptual diagram of a multi-unit UAV system 500 that could be deployed to service an area. The illustrated embodiment shows three UAV 502a-502c (collectively referred to as 502) that are connected in serial or daisy-chain fashion to a single content source 504. For purposes of illustration, only three such UAVs are illustrated. It should be appreciated that more or fewer than 3 could be used in various embodiments and deployments. It should also be appreciated that while the illustrated embodiment is described as including UAVs similar to those illustrated in FIG. 3 and utilized to provide content to an area, the other configurations and uses of the UAVs could also be deployed in this manner.

The content source 504 is directly connected to a first UAV 502a via transmission medium 506a. The content delivery system in UAV 502a includes the ability to direct the content into one or more of three directions: (1) to the propulsion system of UAV 502a, (2) to the service system of UAV 502a, and/or (3) to the content delivery system of UAV 502b. Likewise, the content delivery system in UAV 502b includes the ability to direct the content into one or more of three directions: (1) to the propulsion system of UAV 502b, (2) to the service system of UAV 502b, and/or (3) to the content delivery system of UAV 502c. In the illustrated embodiment, in which UAV 502c is the final UAV in the serial chain, the content delivery system in UAV 502c only requires the ability to direct the content into one or more of two directions: (1) to the propulsion system of UAV 502c, and/or (2) to the service system of UAV 502a. While the UAV 502c may be equipped with the ability to send content to another UAV, in the illustrated embodiment it is not required or utilized.

Figure 6:
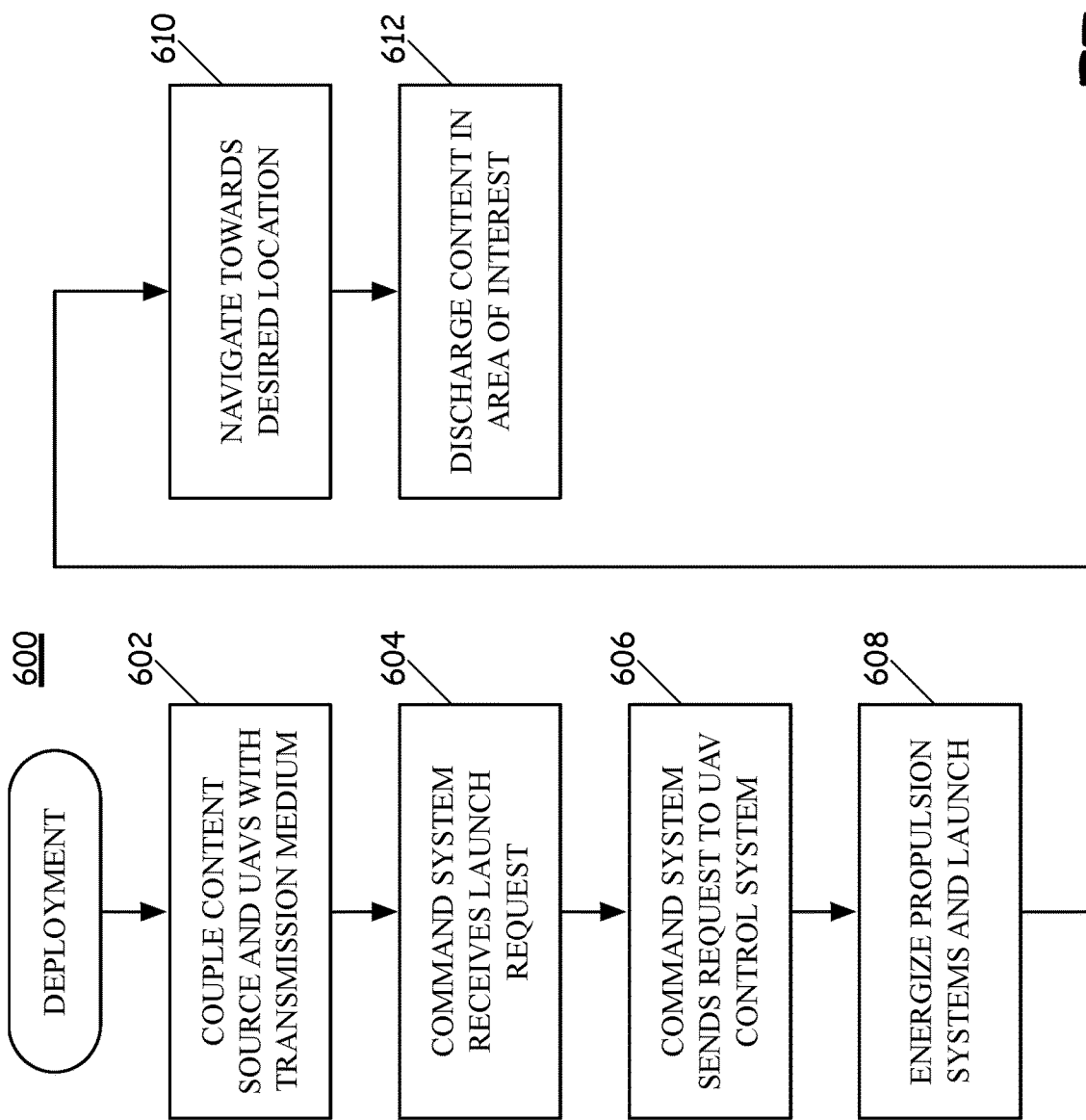
FIG. 6 is a flow diagram illustrating the operation of an exemplary embodiment of the UAV system 500 for delivering content to a desired location.

In a typical operation, as depicted in the flow diagram of FIG. 6, the content source 504 is coupled to a first UAVa using transmission medium 506a, the first UAVa is coupled to a second UAVb using transmission medium 506b and the second UAVb is coupled to a third UAVc using transmission medium 506c 602. The content source 504 can supply pressurized content to UAV 502a and the command system 508 can be used to request deployment of the UAVs 604. It should be appreciated that in some embodiments, a simple command to deploy the UAVs may result in the system automatically turning on and deploying each of the UAVs or, in other embodiments the process may be accomplished manually by a user interfacing with the command system 508 and controlling each launch. Regardless of the implementation, the content can be delivered to each of the UAVs either simultaneously, or in any order by controlling the content delivery systems in each of the UAVs 502. For example, the content delivery system for UAV 502a and 502b may be initialized to direct 100% of the content to UAV 502c. As such, UAV 502c could then be launched in response to the request being received and sent by the command system 504 606 by energizing the propulsion system of UAV 502c 608. Once the control system of UAV 502c determines the UAV 502c is deployed, it can notify the command system 508 or the control system of UAV 502b. The control system of 502b can then request the content delivery system to direct some of the content towards the propulsion system of UAV 502b to cause it to launch. It should be noted that in this process the content source 504 may need to be controlled to supply more content pressure. Similarly, once UAV 502b is deployed, the control system of UAV 502b may notify the command system 508 and/or the control system of UAV 502a that it is launched. In response, the control system in UAV 502a can control the content delivery system to direct a portion of the content towards the propulsion system of UAV 502a to cause it to launch.

Once the UAVs 502 are launched, or even after one or more are launched, the launched UAVs may be navigated towards the desired location 610. Once one or more of the UAVs reach the desired location, the control system of the UAV can direct the content delivery system to begin delivering content to a target location 612 through the service system and nozzles of the UAV. Again, to ensure that the UAVs remain aloft, the content source 504 may again need to adjust the amount of content being provided. It should be appreciated that with the illustrated embodiment, content can be simultaneously delivered to a wider area of interest.

Figure 7:
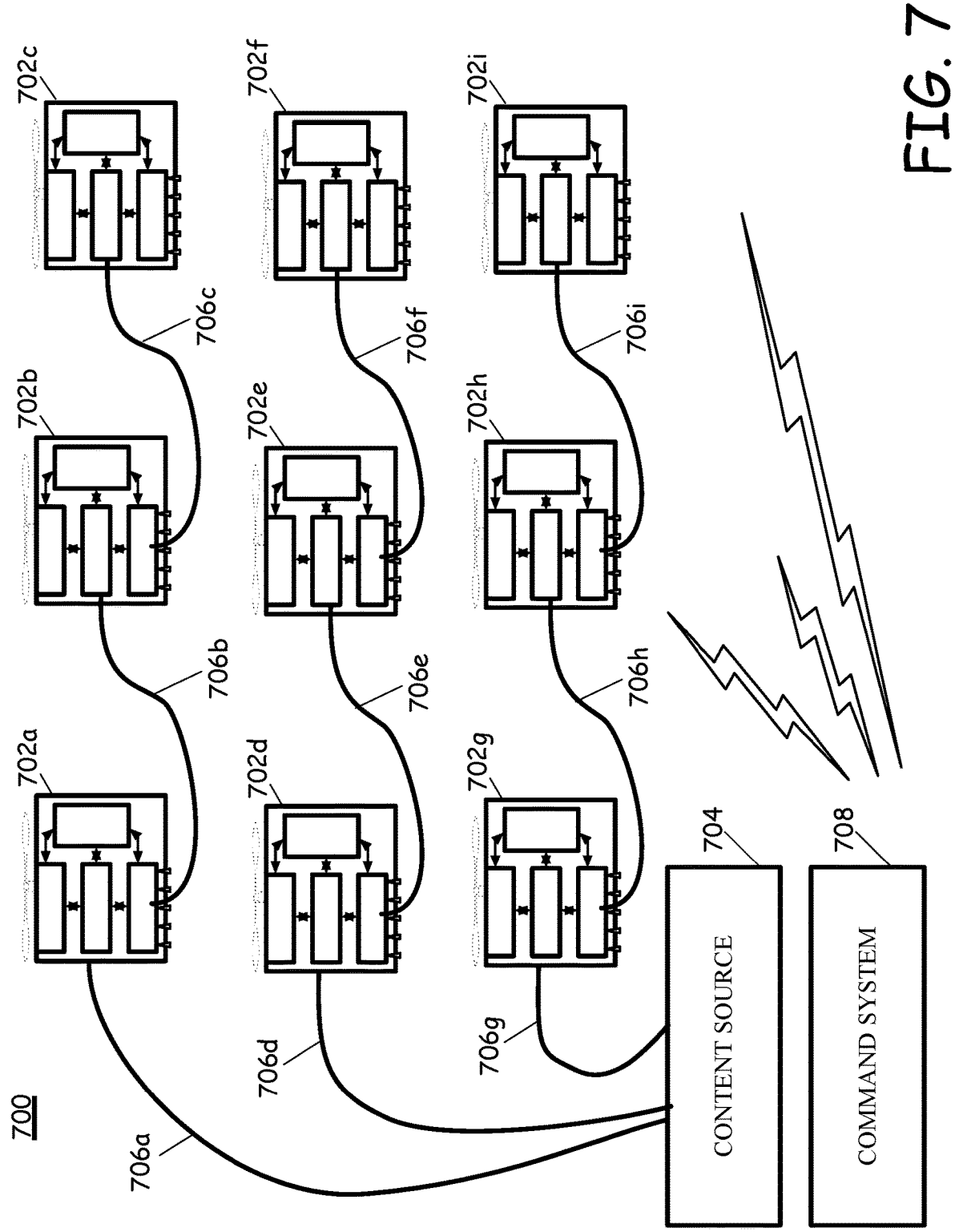
FIG. 7 is a conceptual diagram of a multi-unit UAV system 700 that could be deployed to service a wider area.

FIG. 7 is a conceptual diagram of a multi-unit UAV system 700 that could be deployed to service a wider area. The illustrated embodiment shows three banks of UAVs, UAV 702a-702c, 702d-702f and 702g-702i (collectively referred to as 702). Each bank is illustrated as including three UAVs but, fewer or more UAVs can be included in each bank. Each of the UAVs in a bank are connected in series to the content source. It should also be appreciated that while the illustrated embodiment is described as including UAVs similar to those illustrated in FIG. 3 and utilized to provide content to an area, the other configurations and uses of the UAVs could also be deployed in this manner.

The content source 704 is directly connected to a first UAV of each bank (i.e., UAV 702a, UAV 702d and UAV 702g) via a transmission medium 706a, 706d and 706g respectively. Each of the content delivery systems in UAV 702a, UAV 702d and UAV 702g includes the ability to direct the content into one or more of three directions: (1) to its own propulsion, (2) to its own service system, and/or (3) to the content delivery system next UAV in the bank. Likewise, each of the content delivery systems in UAV 702b, UAV 702e and UAV 702h includes the ability to direct the content into one or more of three directions: (1) to its own propulsion system, (2) to its own service system, and/or (3) to the content delivery system of next UAV in the bank. In the illustrated embodiment, the UAVs at the end of the serial chain only require the ability to direct the content into one or more of two directions: (1) to its own propulsion system, and/or (2) to its own service system. While the UAVs at the end of the chain may be equipped with the ability to send content to another UAV, in the illustrated embodiment it is not required or utilized.

In a typical operation, as depicted in the flow diagram of FIG. 6, the content source 704 is coupled to one or more of the first UAVs (702a, 702d, 702g) a using transmission mediums 706a, 706d, 706g respectively. Thus, the first UAV of each bank would be interfaced to the content source 704. Similar to the description above, each of the other UAVs can be daisy chained to the content source 704 to create a mesh or array of UAVs. The content source 704 can supply pressurized content to UAV 502a, d and g, and the command system 708 can be used to request deployment of one or more of the UAVs. It should be appreciated that in some embodiments, a simple command to deploy the UAVs may result in the system automatically turning on and deploying each of the UAVs in each bank of UAVs or, in other embodiments the process may be accomplished manually by a user interfacing with the command system 708 and controlling each launch. Regardless of the implementation, the content can be delivered to each of the UAVs either simultaneously, or in any order by controlling the content delivery systems in each of the UAVs 502.

Once the UAVs 702 are launch, or even after one or more are launched, the launched UAVs may be navigated towards the desired location 610. Once one or more of the UAVs reach the desired location, control system of the UAV can direct the content delivery system to begin delivering content to a target location 612 through the service system and nozzles of the UAV.

The transmission medium can vary between the exemplary embodiments. In one embodiment, the transmission medium may be a single, light-weight tube that runs from the content source to one or more UAVs. The UAV can then receive pressurized content and will then need to exhaust out of the UAV either by transmitting or directing the content to another UAV or by simply exhausting it to the atmosphere or a particular target. In other embodiments, the transmission medium may include a forward channel and a reverse channel. This embodiment of the transmission medium advantageously allows the pressurized content from the content source to drive the propulsion systems of one or more UAVs without having to exhaust the content. Thus, the transmission medium from the content source to a UAV would include two channels or two tubes that may be bundled together. Likewise, the transmission medium running between each UAV may also include a forward and reverse channel. In yet other embodiments, the transmission medium may also include a communications line allowing the command system to communicate directly to one or more of the UAVs over a wired or hard connection rather than a wireless connection.

An exemplary application of various embodiments of the UAV system, as briefly mentioned above, is in the context of helping to extinguish fires, especially forest fires. One aspect, advantage or purpose of such a deployment of the UAV system is to alleviate the need for firefighters to be in close physical proximity with a fire. To accomplish this goal, embodiments of a UAV system leverage a pumping station as the content source, in communication through a tether hose (transmission medium) to one or more remotely controlled UAVs.

It is envisioned that UAV system components may include spray nozzles, misting nozzles, infrared cameras, video cameras, protective aspects (Kevlar shields, etc.), turbines (air driven or water driven), control circuitry including electric motors, solenoid valves, rudders/flaps, jets, etc. Certain embodiments of UAV components may have one or more water-driven turbines for providing lift and/or one or more adjustable turbines or propellers for providing directional adjustment. Some embodiments may exhaust water through the turbine for application onto a fire or on an area where it appears the fire may migrate. Other embodiments may comprise a separate nozzle with water supply line in the transmission medium for spraying water on a fire.

It is also envisioned that a tether hose or hoses used in a given embodiment of a UAV system may comprise multiple sections plus a fiber optic/control wire conduit. The sections may be used thusly, depending on embodiment: 2 for powering UAVs via high pressure water supplied to tandem turbines, 1 for recirculation of the water supplied to the turbines and 1 for fire retardant injection. Fiber optic or other control wires may also be included in a given tether hose to provide a means for sending and receiving control signals from control circuits residing within a given UAV component. Notably, it is envisioned that a given UAV may be controlled by electronic signals to an electrically driven motor, air signals to an air driven motor (if tether hose includes a high pressure air line supplied by compressed air) or pressurized water. Further, although a particular tether hose configuration may be novel in and of itself, a UAV system covered by this specification is not limited to include any particular tether hose arrangement. As a non-limiting example, a three or four channel tether could be utilized that would allow for two hose sections to operate as a forward and reverse channel for the delivery of pressurized content for driving the propulsion system and one or two hose sections to provide content simply for dispersing. Thus, these latter hose sections would deliver pressurized content that is not used to drive the propulsion system, for instance, it would not pass through a turbine based gear box that would provide lift power.

The content source in the various embodiments vary between embodiments. In some embodiments, the content source may be a local water source such as a pond or water hydrant or may be a reservoir/tank that resides on a truck or mobile platform. As a non-limiting example, a mobile platform may include a truck including a truck-based pumping station. Advantageously, the UAV system can be packaged on the truck or mobile platform, and thus can easily be driven to the point of deployment. In some embodiments, the content can be provided via a gravitational force.

Figure 8:
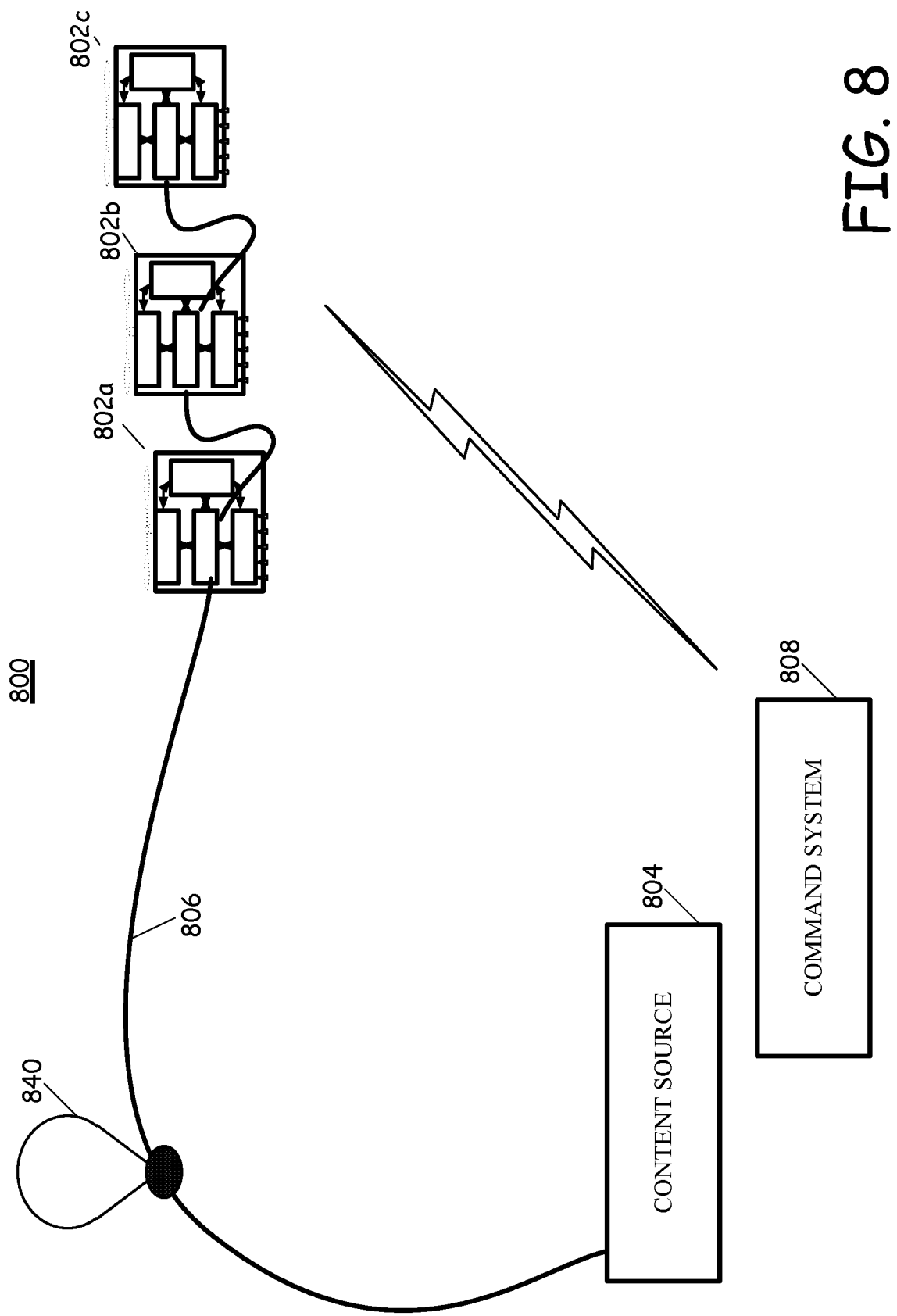
FIG. 8 is a functional block diagram of a long-range UAV system 800 that could be used for servicing wide areas or very remote areas, such as for fighting forest fires.

FIG. 8 is a functional block diagram of a long-range UAV system 800 that could be used for servicing wide areas or very remote areas, such as for fighting forest fires. The various components of the UAV system 800 are envisioned to be similar to that which has been described above relative to the other embodiments, such as UAV system 200, 300, 500 and 700. A content source 804, such as a pumping station may pump from a water source. It is envisioned that a long-range UAV system 800 may be configured for deployment to remote fires such as, for example, forest fires. The base/pumping station 804 may be an airlifted skid or may be mounted on a mobile platform such as a truck bed. The base pumping station may include one or more pumps for pumping water from the water source through the transmission medium 806 and to the UAV device 802*a*, 802*b*, 802*c*. The content source 804 may also include a generator and associated instrumentation, as would be understood by one of ordinary skill in the art.

The content source 804 may be connected via the transmission medium 806 to an anchor component 840 such as, but not limited to, a helicopter, a blimp, a balloon, etc. It is envisioned that the anchor component 840 may provide lift to the system 800 so that tethers leading to the UAVs and between the UAVs, as well as the UAVs themselves may be safely maintained at an altitude above the fire and/or above a tree canopy level. The anchor component 840 may also include a reservoir for holding a volume of water pumped to it by the pumping station within the content source 804. From the anchor point 840, water and control signals and data communications can be transmitted to and from the UAVs 802*a*, 802*b* and 802*c*.

Notably, it is envisioned that certain embodiments of a UAV system 200, 300, 500, 700 and 800 may include more or less components than are depicted in the drawings and, as such, the figures are not meant to limit the scope of the disclosure.

The various embodiments of the UAVs may include any or all of the features described above relative to each described embodiment of the UAVs. Advantageously, the positioning of the UAVs may be remotely controlled by an operator in communication with the UAVs through data channels embedded in the transmission mediums 806 or wirelessly. Positioning feedback, such as GPS data, and video feedback from the UAVs, such as video or infrared imaging, may be used by the operator to accurately position the UAVs over a fire and release water or fire retardant to extinguish the fire. It is envisioned that the operator may be located at or near the base content source 804 or anywhere so long as the operator is in communication with the UAV system, as would be understood by one of ordinary skill in the art of telecommunications, satellite communications, Internet communications, etc.

Various aspects, features and characteristics of the present invention have been described. Not all of the aspects, features or characteristics are required for each and every embodiment of the present invention. However, it will be appreciated that the various aspects, features, characteristics and combinations thereof may be considered novel in and of themselves. Further documentation in support of the description detailed herein is appended to this application.

What is claimed is:

1. An unmanned aerial vehicle (UAV) system for delivering liquid content comprising:
   a pressurized liquid driven UAV comprising one or more propellers, comprising:
      a propulsion system comprising a liquid media-driven motor comprising a turbine and configured to rotate the one or more propellers and, in combination with the liquid media-driven motor, either a battery powered electrical motor or a hydrocarbon-based combustion motor;
      a liquid content delivery system;
      a service system; and
      a control system communicatively coupled to the propulsion system for controlling the movement of the UAV, to the service system for controlling discharge of the liquid content to a desired location, and to the liquid content delivery system for controlling the delivery of the liquid content to the liquid media-driven motor of the propulsion system and the service system;
   a liquid content source, the liquid content source providing pressurized liquid content to the liquid content delivery system of the UAV;
   a transmission medium used to communicate the liquid content from the liquid content source to the liquid content delivery system of the UAV;
   a command system comprising:
      a command reception interface for receiving commands to be sent to the UAV; and
      a command transmission output for sending the received commands to the control system of the UAV;
   wherein the liquid media-driven motor of the propulsion system is powered by the liquid content delivered through the transmission medium to the liquid content delivery system; and
   wherein the UAV can be manipulated to deliver liquid content to a desired location, after the liquid content has been used as a motive force for the liquid media-driven motor of the propulsion system, through the command system receiving commands to control the movement of the UAV and commands to control the delivery of the liquid content and sending the received commands to the control system of the UAV.

2. The UAV system of claim 1, wherein the liquid content delivery system includes a valve that can be used to regulate the flow of the liquid content.

3. The UAV system of claim 1, wherein multiple UAVs are coupled to the liquid content source in a serial manner with the transmission medium.

4. The UAV system of claim 1, wherein multiple UAVs are coupled to the liquid content source in a parallel manner with the transmission medium.

5. The UAV system of claim 1, wherein the transmission medium includes a forward channel and a return channel, wherein the forward channel carries liquid content from the liquid content source to the UAV and the return channel carries liquid content from the UAV back to the liquid content source.

6. The UAV system of claim 1, wherein the liquid media-driven motor further includes a power output for providing power to the control system.

7. The UAV system of claim 6, further comprising a back-up battery that can be used to power the control system and, the media-driven motor further includes a battery charging output for charging the back-up battery.

8. The UAV system of claim 1, wherein the command system and the control system are communicatively coupled by a wireless channel.

* * * * *